US012682187B2

(12) United States Patent
He et al.

(10) Patent No.: US 12,682,187 B2
(45) Date of Patent: Jul. 14, 2026

(54) UNIFIED NATURAL LANGUAGE MODEL WITH SEGMENTED AND AGGREGATE ATTENTION

(71) Applicant: MICROSOFT TECHNOLOGY LICENSING, LLC, Redmond, WA (US)

(72) Inventors: Pengcheng He, Sammamish, WA (US); Jianfeng Gao, Woodinville, WA (US); Nanshan Zeng, Bellevue, WA (US); Xuedong Huang, Yarrow Point, WA (US); Wei Xiong, Bellevue, WA (US); Baolin Peng, Issaquah, WA (US)

(73) Assignee: Microsft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 17/970,305

(22) Filed: Oct. 20, 2022

(65) Prior Publication Data

US 2024/0062020 A1 Feb. 22, 2024

Related U.S. Application Data

(60) Provisional application No. 63/398,443, filed on Aug. 16, 2022.

(51) Int. Cl.
*G06F 40/56* (2020.01)
*G06F 40/149* (2020.01)
(Continued)

(52) U.S. Cl.
CPC ............ *G06F 40/56* (2020.01); *G06F 40/149* (2020.01); *G06F 40/284* (2020.01); *G06F 40/40* (2020.01); *G06F 40/51* (2020.01)

(58) Field of Classification Search
CPC ...... G06F 40/149; G06F 40/284; G06F 40/30; G06F 40/40; G06F 40/51; G06F 40/56
See application file for complete search history.

(56) References Cited

U.S. PATENT DOCUMENTS 10,573,312 B1 2/2020 Thomson et al.
10,977,424 B2 4/2021 Panguluri
(Continued)

FOREIGN PATENT DOCUMENTS

CA 2744744 A1 1/2012
CA 3052862 A1 2/2020
(Continued)

OTHER PUBLICATIONS

He, et al., "Deberta: Decoding-Enhanced Bert with Disentangled Attention", In Proceedings of International Conference on Learning Representations, Sep. 28, 2020, 21 Pages. (Year: 2020).*
(Continued)

*Primary Examiner* — Angela A Armstrong
(74) *Attorney, Agent, or Firm* — Workman Nydegger

(57) ABSTRACT

Systems and methods are provided for training and using a novel unified language foundation model. An encoder-decoder natural language model is obtained and various training data is obtained and used for training. The training process integrates a combination of replaced token detection, corrupted span reconstruction, and disentangled attention methodologies to produce a unified encoder-decoder model. The trained model is trained for performing both natural language understanding (NLU) tasks and natural language generation (NLG) tasks. Attention applied to the model is applied discretely to segmented chunks of encoded data during processing to improve the efficiency of applying attention by the model.

18 Claims, 9 Drawing Sheets

(51) Int. Cl.

| | |
|---|---|
| *G06F 40/284* | (2020.01) |
| *G06F 40/40* | (2020.01) |
| *G06F 40/51* | (2020.01) |

(56) References Cited

U.S. PATENT DOCUMENTS

| | | | | |
|---|---|---|---|---|
| 11,822,875 | B2 | 11/2023 | Mukherjee | |
| 12,045,568 | B1 | 7/2024 | Shrivastava | |
| 2004/0133560 | A1 | 7/2004 | Simske | |
| 2012/0210203 | A1 | 8/2012 | Kandekar | |
| 2015/0195406 | A1 | 7/2015 | Dwyer et al. | |
| 2015/0356401 | A1 | 12/2015 | Vinyals et al. | |
| 2017/0161259 | A1 | 6/2017 | Zhao | |
| 2017/0186102 | A1 | 6/2017 | Di et al. | |
| 2018/0061256 | A1 | 3/2018 | Elchik | |
| 2018/0089156 | A1 | 3/2018 | Kapoor et al. | |
| 2019/0245972 | A1 | 8/2019 | Dwyer | |
| 2020/0081909 | A1 | 3/2020 | Li | |
| 2021/0342361 | A1 | 11/2021 | Radzewsky | |
| 2022/0075953 | A1 | 3/2022 | Khetan | |
| 2022/0222441 | A1 | 7/2022 | Liu | |
| 2023/0179709 | A1 | 6/2023 | Dwyer | |
| 2023/0230589 | A1 | 7/2023 | Giovanardi | |
| 2023/0237278 | A1 | 7/2023 | Yuan | |
| 2023/0315987 | A1 | 10/2023 | Glen | |
| 2023/0334244 | A1* | 10/2023 | Tensmeyer | G06N 3/09 |
| 2024/0062018 | A1 | 2/2024 | He et al. | |

FOREIGN PATENT DOCUMENTS

| | | | |
|---|---|---|---|
| CA | 3148554 | A1 | 2/2021 |
| CA | 3178823 | A1 | 5/2022 |
| CA | 3016169 | C | 1/2024 |
| CN | 103714813 | A | 4/2014 |
| CN | 108628833 | A | 10/2018 |
| CN | 111062221 | A | 4/2020 |
| CN | 112699677 | A | 4/2021 |
| CN | 111460132 | B | 8/2021 |
| CN | 113449513 | A | 9/2021 |
| CN | 114402384 | A | 4/2022 |
| CN | 113051932 | B | 11/2023 |
| CN | 117015780 | A | 11/2023 |
| CN | 117195887 | A | 12/2023 |
| CN | 117236324 | A | 12/2023 |
| JP | 3597697 | B2 | 12/2004 |
| JP | 4345321 | B2 | 10/2009 |
| WO | 2020214316 | A1 | 10/2020 |

OTHER PUBLICATIONS

Dong, et al., "Unified Language Model Pre-training for Natural Language Understanding and Generation", in repository of Arxiv Code: 1905.03197v3 [cs. CL], Oct. 15, 2019, 14 Pages. (Year: 2019).*

U.S. Appl. No. 17/970,174, filed Oct. 20, 2022.

Aghajanyan, et al., "Muppet: Massive Multi-task Representations with Pre-Finetuning", In Repository of arXiv:2101.11038v1, Jan. 26, 2021, 12 Pages.

Allahyari, et al., "Text Summarization Techniques: A Brief Survey", In Repository of arXiv:1707.02268v2, Jul. 10, 2017, 9 Pages.

Bajaj, et al., "Metro: Efficient denoising pretraining of large scale autoencoding language models with model generated signals", In Repository of arXiv:2204.06644v2, Apr. 16, 2022, pp. 1-28.

Bentivogli, et al., "The Fifth Pascal Recognizing Textual Entailment Challenge", In Proceedings of The Text Analysis Conference, Nov. 17, 2009, 18 Pages.

Brown, et al., "Language Models are Few-Shot Learners", In Repository of arXiv:2005.14165v2, Jun. 1, 2020, 74 Pages.

Celikyilmaz, et al., "Evaluation of text generation: A survey", In Repository of arXiv:2006.14799v1, Jun. 26, 2020, 58 Pages.

Cer, et al., "Semeval-2017 task 1: Semantic textual similarity-multilingual and cross-lingual focused evaluation", In Repository of arXiv:1708.00055v1, Jul. 31, 2017, 14 Pages.

Chi, et al., "XLM-E: Cross-lingual Language Model Pre-training via ELECTRA", In Repository of arXiv:2106.16138v1, Jun. 30, 2021, 12 Pages.

Chopra, et al., "Abstractive Sentence Summarization with Attentive Recurrent Neural Networks", In Proceedings of the Conference of the North American Chapter of the Association for Computational Linguistics: Human Language Technologies, Jun. 12, 2016, pp. 93-98.

Chowdhery, et al., "Palm: Scaling language modeling with pathways", In Repository of arXiv:2204.02311v4, Sep. 29, 2022, pp. 1-87.

Clark, et al., "BoolQ: Exploring the surprising difficulty of natural yes/no questions", In Proceedings of the Conference of the North American Chapter of the Association for Computational Linguistics: Human Language Technologies, vol. 1 (Long and Short Papers), Jun. 2, 2019, pp. 2924-2936.

Clark, et al., "ELECTRA: Pre-training Text Encoders as Discriminators Rather Than Generators", In Proceedings of International Conference on Learning Representations, Mar. 11, 2020, pp. 1-18.

Cohan, et al., "A discourse-aware attention model for abstractive summarization of long documents", In Repository of arXiv:1804.05685v2, May 22, 2018, 7 Pages.

Conneau, et al., "Cross-lingual language model pretraining", In Annual Conference on Neural Information Processing Systems, Dec. 8, 2019, pp. 1-11.

Conneau, et al., "XNLI: Evaluating Cross-lingual Sentence Representations", In Proceedings of Conference on Empirical Methods in Natural Language Processing, Oct. 31, 2018, pp. 2475-2485.

Dagan, et al., "The Pascal Recognising Textual Entailment Challenge", In Proceedings of the First International Conference on Machine Learning Challenges: Evaluating Predictive Uncertainty Visual Object Classification, and Recognizing Textual Entailment, Apr. 11, 2005, 8 Pages.

Dai, et al., "Transformer-XL: Attentive Language Models beyond a Fixed-Length Context", In Proceedings of the 57th Annual Meeting of the Association for Computational Linguistics, Jul. 28, 2019, pp. 2978-2988.

Devlin, et al., "BERT: Pre-Training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Dolan, et al., "Automatically Constructing a Corpus of Sentential Paraphrases", In Proceedings of the Third International Workshop on Paraphrasing, Jan. 1, 2005, pp. 9-16.

El-Kishky, et al., "Ccaligned: A massive collection of cross-lingual web-document pairs", In Repository of arXiv:1911.06154v2, Oct. 11, 2020, 10 Pages.

Fabbri, et al., "Multi-news: A largescale multi-document summarization dataset and abstractive hierarchical model", In Repository of arXiv:1906.01749v2, Jun. 7, 2019, 11 Pages.

Gao, et al., "Neural approaches to conversational information retrieval", In Repository of arXiv:2201.05176v1, Jan. 13, 2022, 150 Pages.

Gehrmann, et al., "Repairing the cracked foundation: A survey of obstacles in evaluation practices for generated text", In Repository of arXiv:2202.06935v1, Feb. 14, 2022, 41 Pages.

Gehrmann, et al., "The gem benchmark: Natural language generation, its evaluation and metrics", In Repository of arXiv:2102.01672v2, Feb. 3, 2021, 24 Pages.

Giampiccolo, et al., "The Third PASCAL Recognizing Textual Entailment Challenge", In Proceedings of Workshop on Textual Entailment and Paraphrasing, Jun. 28, 2007, pp. 1-9.

Gliwa, et al., "Samsum corpus: A human-annotated dialogue dataset for abstractive summarization", In Repository of arXiv:1911.12237v1, Nov. 27, 2019, 10 Pages.

Gokaslan, et al., "OpenWebText Corpus", Retrieved from: http://Skylion007.github.io/OpenWebTextCorpus, 2019, 3 Pages.

Grusky, et al., "Newsroom: A dataset of 1.3 million summaries with diverse extractive strategies", In Repository of arXiv:1804.11283v1, Apr. 30, 2018, 12 Pages.

(56) References Cited

OTHER PUBLICATIONS

Guo, et al., "Longt5: Efficient text-to-text transformer for long sequences", In Repository of arXiv:2112.07916v1, Dec. 15, 2021, 11 Pages.
Haim, et al., "The Second PASCAL Recognising Textual Entailment Challenge", In Proceedings of the Second PASCAL Challenges Workshop on Recognising Textual Entailment, Jan. 1, 2006, 9 Pages.
He, et al., "Deberta: Decoding-Enhanced Bert with Disentangled Attention", In Proceedings of International Conference on Learning Representations, Sep. 28, 2020, 21 Pages.
He, et al., "DeBERTaV3: Improving DeBERTa using ELECTRA-Style Pre-Training with Gradient-Disentangled Embedding Sharing", In Repository of arXiv:2111.09543v2, Dec. 8, 2021, 16 Pages.
Hu, et al., "LoRA: Low-Rank Adaptation of Large Language Models", In Repository of arXiv:2106.09685v2, Oct. 16, 2021, pp. 1-26.
Huang, et al., "Music Transformer: Generating Music with Long-Term Structure", Retrieved from: https://magenta.tensorflow.org/music-transformer#:~:text=Generating%20long%20pieces%20of%20music,with%20improved%20long%2Dterm%20coherence, Dec. 13, 2018, 8 Pages.
Izacard, et al., "Leveraging passage retrieval with generative models for open domain question answering", In Repository of arXiv:2007.01282v1, Jul. 2, 2020, 6 Pages.
Ji, et al., "Survey of hallucination in natural language generation", In Repository of arXiv:2202.03629v3, Apr. 5, 2022, pp. 1-45.
Joshi, et al., "SpanBERT: Improving Pre-training by Representing and Predicting Spans", In Journal of Transactions of the Association for Computational Linguistics, vol. 8, Jan. 1, 2020, pp. 64-77.
Kanakarajan, et al., "Small-Bench NLP: Benchmark for Small Single GPU Trained Models in Natural Language Processing", In Repository of arXiv:2109.10847v2, Sep. 23, 2021, 5 Pages.
Khashabi, et al., "Genie: A leaderboard for human-in-the-loop evaluation of text generation", In Repository of arXiv:2101.06561v2, Jun. 11, 2021, 11 Pages.
Khashabi, et al., "Looking Beyond the Surface: A Challenge Set for Reading Comprehension over Multiple Sentences", In Proceedings of the Conference of the North American Chapter of the Association for Computational Linguistics: Human Language Technologies, Jun. 6, 2018, pp. 252-262.
Kim, et al., "Abstractive summarization of reddit posts with multi-level memory networks", In Repository of arXiv:1811.00783v1, Nov. 2, 2018, 12 Pages.
Kingma, et al., "Adam: A Method for Stochastic Optimization", In Repository of arXiv:1412.6980v1, Dec. 22, 2014, pp. 1-9.
Kryscinski, et al., "Neural text summarization: A critical evaluation. ", In Proceedings of the Conference on Empirical Methods in Natural Language Processing and the 9th International Joint Conference on Natural Language Processing, Nov. 3, 2019, pp. 540-551.
Ladhak, et al., "Wikilingua: A new benchmark dataset for cross-lingual abstractive summarization", In Repository of arXiv:2010.03093v1, Oct. 7, 2020, 15 Pages.
Lai, et al., "RACE: Large-scale Reading Comprehension Dataset From Examinations", In Proceedings of the Conference on Empirical Methods in Natural Language Processing, Sep. 7, 2017, pp. 785-794.
Levesque, et al., "The Winograd Schema Challenge", In Proceedings of Thirteenth International Conference on the Principles of Knowledge Representation and Reasoning, May 17, 2012, pp. 552-561.
Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
Liu, et al., "Hierarchical transformers for multi-document summarization", In Proceedings of the 57th Annual Meeting of the Association for Computational Linguistics, Jul. 28, 2019, pp. 5070-5081.
Liu, et al., "ROBERTa: A Robustly Optimized BERT Pretraining Approach", In Repository of arXiv:1907.11692v1, Jul. 26, 2019, 13 Pages.
Liu, et al., "Text summarization with pretrained encoders", In Proceedings of the Conference on Empirical Methods in Natural Language Processing, Nov. 3, 2019, pp. 3730-3740.
Zoph, et al., "Designing effective sparse expert models", In Repository of arXiv:2202.08906v1, Feb. 17, 2022, pp. 1-38.
Loshchilov, et al., "Fixing Weight Decay Regularization in Adam", In Proceedings of International Conference on Learning Representations, Feb. 16, 2018, 14 Pages.
Meng, et al., "Coco-Im: Correcting and contrasting text sequences for language model pretraining", In Repository of arXiv:2102.08473v2, Oct. 27, 2021, 16 Pages.
Nagel, Sebastian, "Common Crawl News", Retrieved from: https://commoncrawl.org/2016/10/news-dataset-available/, Oct. 4, 2016, 3 Pages.
Nallapati, et al., "Abstractive Text Summarization using Sequence-to-sequence RNNs and Beyond", In Proceedings of the 20th SIGNLL Conference on Computational Natural Language Learning, Aug. 7, 2016, pp. 280-290.
Narayan, et al., "Don't give me the details, just the summary! topic-aware convolutional neural networks for extreme summarization", In Repository of arXiv:1808.08745v1, Aug. 27, 2018, 11 Pages.
Pang, et al., "Long document summarization with top-down and bottom-up inference", In Repository of arXiv:2203.07586v1, Mar. 15, 2022, pp. 1-21.
Pasunuru, et al., "Data augmentation for abstractive query-focused multi-document summarization", In Proceedings of the AAAI Conference on Artificial Intelligence, vol. 35, May 18, 2021, pp. 13666-13674.
Peng, et al., "Large-scale pre-training for goal-directed dialogue", In Repository of arXiv:2206.11309v1, Jun. 22, 2022, 14 Pages.
Pilehvar, et al., "WiC: The Word-in-Context Dataset for Evaluating Context-Sensitive Meaning Representations", In Proceedings of the Conference of the North American Chapter of the Association for Computational Linguistics: Human Language Technologies, vol. 1, Jun. 2, 2019, pp. 1267-1273.
Radford, et al., "Language Models are Unsupervised Multitask Learners", In Journal of OpenAl blog, vol. 1, Issue 8, Feb. 24, 2019, 24 Pages.
Raffel, et al., "Exploring the Limits of Transfer Learning with a Unified Text-to-Text Transformer", In Journal of Machine Learning Research, vol. 21, Issue 140, Jun. 21, 2020, pp. 1-67.
Rajpurkar, et al., "Know What You Don't Know: Unanswerable Questions for SQuAD", In Proceedings of the 56th Annual Meeting of the Association for Computational Linguistics (vol. 2: Short Papers), Jul. 15, 2018, pp. 784-789.
Rajpurkar, et al., "SQuAD: 100,000+ Questions for Machine Comprehension of Text", In Proceeding of the Conference on Empirical Methods in Natural Language Processing, Nov. 1, 2016, pp. 2383-2392.
Rothe, et al., "A thorough evaluation of task-specific pretraining for summarization", Proceedings of the Conference on Empirical Methods in Natural Language Processing, Nov. 7, 2021, pp. 140-145.
Rush, et al., "A neural attention model for abstractive sentence summarization", In Proceedings of the Conference on Empirical Methods in Natural Language Processing, Sep. 17, 2015, pp. 379-389.
Sang, et al., "Introduction To The CoNLL-2003 Shared Task: Language-Independent Named Entity Recognition", In Proceedings of Seventh Conference on Natural Language Learning at HLT-NAACL, Jun. 12, 2003, 6 Pages.
Sanh, et al., "Multitask prompted training enables zero-shot task generalization", In Proceedings of the Tenth International Conference on Learning Representations, Mar. 17, 2022, pp. 1-216.
Schwenk, et al., "Mining billions of high-quality parallel sentences on the web", In Repository of arXiv:1911.04944v1, Nov. 19, 2019, 13 Pages.
Scialom, et al., "Mlsum: The multilingual summarization corpus", In Repository of arXiv:2004.14900v1, Apr. 30, 2020, 16 Pages.

(56) References Cited

OTHER PUBLICATIONS

See, et al., "Get to the point: Summarization with pointer-generator networks", In Repository of arXiv:1704.04368v2, Apr. 25, 2017, 20 Pages.
Shaw, et al., "Self-attention with relative position representations", In Proceedings of the Conference of the North American Chapter of the Association for Computational Linguistics: Human Language Technologies, vol. 2 (Short Papers), Jun. 1, 2018, pp. 464-468.
Shoeybi, et al., "Megatron-LM: Training Multi-Billion Parameter Language Models Using GPU Model Parallelism", In Repository of arXiv:1909.08053v3, Sep. 17, 2019, 15 Pages.
Simons, et al., "The CommitmentBank: Investigating projection in naturally occurring discourse", In Proceedings of Sinn und Bedeutung, vol. 23, Issue 2, Jul. 25, 2019, pp. 107-124.
Socher, et al., "Recursive Deep Models for Semantic Compositionality Over a Sentiment Treebank", In Proceedings of the Conference on Empirical Methods in Natural Language Processing, Oct. 18, 2013, pp. 1631-1642.
Tay, et al., "UL2: Unifying Language Learning Paradigms", In Repository of arXiv:2205.05131v2, Oct. 8, 2022, pp. 1-37.
Trinh, et al., "A Simple Method for Commonsense Reasoning", In Repository of arXiv:1806.02847v1, Jun. 7, 2018, 12 Pages.
Vaswani, et al., "Attention Is All You Need", In Proceedings of Advances in Neural Information Processing Systems, Dec. 4, 2017, 11 Pages.
Wang, et al., "GLUE: A Multi-Task Benchmark and Analysis Platform for Natural Language Understanding", In Proceedings of 7th International Conference on Learning Representations, Feb. 23, 2019, pp. 1-20.
Wang, et al., "Multi-task learning for multilingual neural machine translation", In Proceedings of the Conference on Empirical Methods in Natural Language Processing, Nov. 16, 2020, pp. 1022-1034.
Wang, et al., "SuperGLUE: A Stickier Benchmark for General-Purpose Language Understanding Systems.", In Proceedings of 33rd Conference on Neural Information Processing Systems, Dec. 8, 2019, pp. 1-15.
Warstadt, et al., "Neural Network Acceptability Judgments", In Repository of arXiv:1805.12471v2, Sep. 11, 2018, 12 Pages.
Wei, et al., "Finetuned language models are zero-shot learners", In Repository of arXiv:2109.01652v4, Dec. 2, 2021, pp. 1-47.
Williams, et al., "A Broad-Coverage Challenge Corpus for Sentence Understanding through Inference", In Proceedings of the Conference of the North American Chapter of the Association for Computational Linguistics: Human Language Technologies, vol. 1, Jun. 6, 2018, pp. 1112-1122.
Xiao, et al., "Primer: Pyramid-based masked sentence pre-training for multi-document summarization", In Repository of arXiv:2110.08499v1, Oct. 16, 2021, 15 Pages.
Xue, et al., "mT5: A Massively Multilingual Pre-trained Text-to-Text Transformer", In Proceedings of the Conference of the North American Chapter of the Association for Computational Linguistics: Human Language Technologies, Jun. 6, 2021, pp. 483-498.
Yang, et al., "XLNet: Generalized Autoregressive Pretraining for Language Understanding", In Proceedings of 33rd Conference on Neural Information Processing Systems, Dec. 2019, 11 Pages.
Zellers, et al., "SWAG: A Large-Scale Adversarial Dataset for Grounded Commonsense Inference", In Proceedings of the Conference on Empirical Methods in Natural Language Processing, Oct. 31, 2018, pp. 93-104.
Zhang, et al., "Leveraging pretrained models for automatic summarization of doctor-patient conversations", In Findings of the Association for Computational Linguistics, Nov. 7, 2021, pp. 3693-3712.
Zhang, et al., "Pegasus: Pre-training with extracted gap-sentences for abstractive summarization", In Proceedings of 37th International Conference on Machine Learning, Nov. 21, 2020, 12 Pages.
Zhang, et al., "ReCoRD: Bridging the Gap between Human and Machine Commonsense Reading Comprehension", In Repository of arXiv:1810.12885v1, Oct. 30, 2018, 14 Pages.
Zhu, et al., "Aligning books and movies: Towards story-like visual explanations by watching movies and reading books", In Proceedings of the IEEE international conference on computer vision, Dec. 7, 2015, pp. 19-27.
Zhu, et al., "Mediasum: A large-scale media interview dataset for dialogue summarization", In Repository of arXiv:2103.06410v2, Mar. 12, 2021, 8 Pages.
Dong, et al., "Unified Language Model Pre-training for Natural Language Understanding and Generation", In repository of Arxiv Code: 1905.03197v3 [cs.CL], Oct. 15, 2019, 14 Pages.
Li, et al., "Pretrained Language Models for Text Generation: A Survey", In repository of Arxiv Code: 2105.10311v2 [cs.CL], May 25, 2021, 9 Pages.
"International Search Report and Written Opinion Issued In PCT Application No. PCT/US23/027581", Mailed Date: Sep. 25, 2023, 10 Pages.
"International Search Report and Written Opinion Issued in PCT Application No. PCT/US23/027763", Mailed Date: Sep. 25, 2023, 10 Pages.
Non-Final Office Action mailed on Nov. 20, 2024, in U.S. Appl. No. 17/970,174, 27 pages.
U.S. Appl. No. 63/398,443, filed Aug. 16, 2022.
Final Office Action mailed on Feb. 11, 2025, in U.S. Appl. No. 17/970,174, 26 pages.
Notice of Allowance mailed on May 28, 2025, in U.S. Appl. No. 17/970,174, 8 pages.

* cited by examiner

700

702 Accessing A Natural Language Model

704 Obtaining A Set Of Training Data

706 Creating A Set Of Tokens For The Training Data

708 Generating A Corrupted Span By Masking Token(s) In The Set Of Tokens

710 Replacing Masked Token(s) With Ambiguous Token(s) In The Corrupted Span To Generate Replacement Token Detection Span Data 712 Training And Encoder Of The Natural Language Model With Both (i) The Replacement Token Detection Span Data And (ii) The Corrupted Span

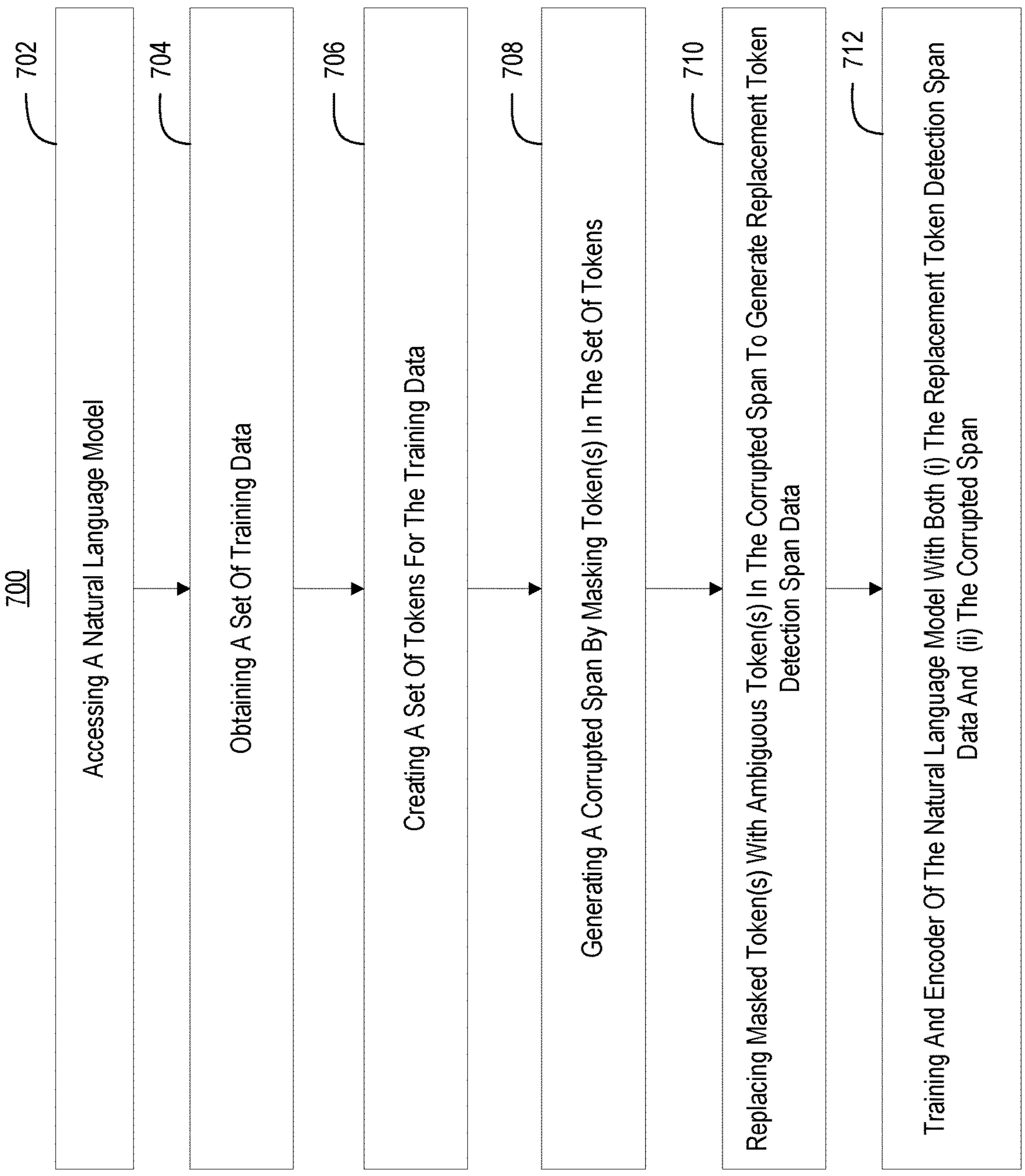

802 — Accessing A Natural Language Model

804 — Obtaining A Set Of Training Data

806 — Generating Encoded Data From The Set Of Training Data

808 — Separating The Encoded Data Into A Set Of Encoded Chunks

810 — Applying Partial/Relative Attention To The Encoded Data In Each Chunk In The Set Of Chunks 812 — Concatenating Each Chunk To Create A Long Representation Of The Encoded Data That Includes Aggregate Attention

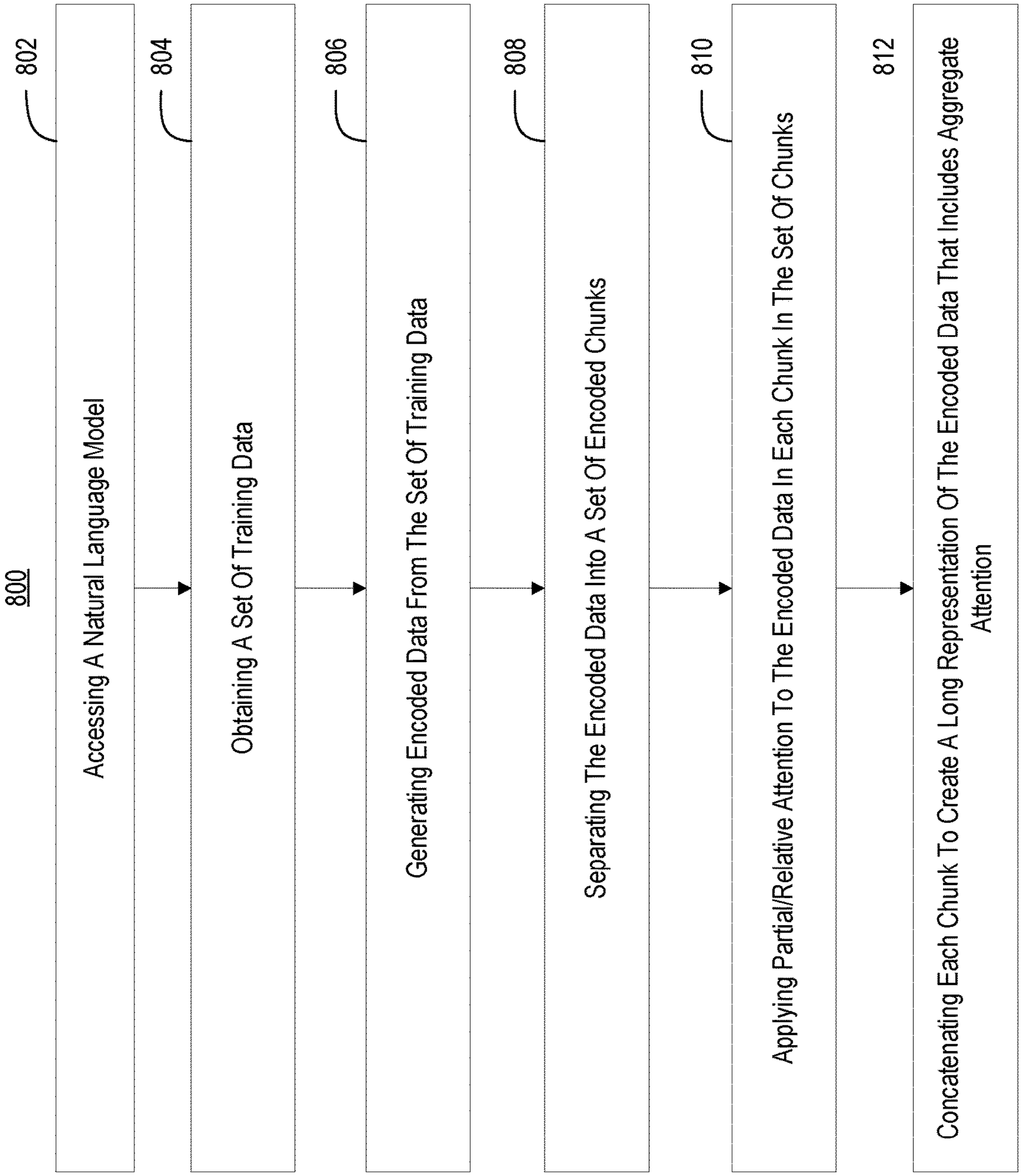

902 — Accessing A Natural Language Model

904 — Obtaining A Set Of Training Data

906 — Identifying A Set Of Sparse Labelled Data From The Set Of Training Data

908 — Generating A Set Of Instructions Corresponding To The Set Of Sparse Labelled Data 910 — Training The Natural Language Model With The Set Of Sparse Labelled Data 912 — Obtaining A Second Set Of Data That Includes Corresponding Instructions That Match The Set Of Instructions Corresponding To The Set Of Sparse Labelled Data 914 — Training The Natural Language Model With The Second Set Of Training Data

FIG. 9

UNIFIED NATURAL LANGUAGE MODEL WITH SEGMENTED AND AGGREGATE ATTENTION

CROSS-REFERENCE TO RELATED APPLICATIONS

This application claims the benefit of and priority to U.S. Provisional Patent Application Ser. No. 63/398,443 filed on Aug. 16, 2022, and entitled "EFFICIENT AND EFFECTIVE UNIFIED LANGUAGE FOUNDATION MODELS," which application is expressly incorporated herein by reference in its entirety. This application is related to U.S. application Ser. No. 17/970,174 filed on Oct. 20, 2022, and entitled "PRE-TRAINING A UNIFIED NATURAL LANGUAGE MODEL WITH CORRUPTED SPAN AND REPLACED TOKEN DETECTION."

BACKGROUND

Background and Relevant Art

Tremendous progress has been made on pre-trained language foundation models or natural language processing (NLP) models. However, most NLP models focus on either natural language generation (NLG) tasks, which are trained to generate natural language output, or natural language understanding (NLU) tasks, which are trained to understand natural language input. The amount of training and parameters required to create a unified foundation model are normally immense.

Some developments have been made to improve NLP tasks, and NLU tasks in particular. For instance, NLU tasks have seen significant progress in becoming more efficient. In contrast, however the efficiency for performing NLG tasks has not improved as much and it has for NLU tasks. One reason for this is because NLG tasks rely on the training of huge generative foundation models, which makes the processing of NLG tasks inefficient for large scale product deployment.

Another problem with existing NLP models is evident when processing long form data, such as, but not limited to streaming data. In particular, some models apply attention to the data being processed, to improve the contextual accuracy of the model outputs. However, when processing long form data, the models experience significant degradation in efficiency, as it is very cumbersome to process extensive amounts of attention concurrently, as occurs in conventional models.

In view of the foregoing, there is an ongoing need for improved efficiency and effectiveness in unified foundation models, and particularly for unified models that are used to perform both NLU and NLG tasks and particularly for models that apply attention to long form datasets.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed methods, systems and devices are directed towards embodiments for a novel unified language foundation model, which integrates a generative language model and an RTD-like discriminative objective to substantially improve both NLU and NLG task performance.

Disclosed systems are used to train and use natural language models to perform NLU and NLG tasks. In some embodiments, the attention applied to the training data and use data is split into different discrete chunks prior to being combined in the final results output by the models to improve efficiencies of performing the NLP tasks, while still preserving the accuracies based on the applied attention. In some embodiments, the systems access a natural language model and obtain a set of training data. The natural language model is applied to the set of training data to generate encoded data. The encoded data is also separated into a set of chunks. The chunks can be formed before encoding or after encoding. Relative attention is applied to the training data of each chunk. Each chunk, after being encoded with the relative attention applied, is concatenated to create a long representation of the encoded data. The long representation of the encoded data includes aggregate/cumulative attention which is based on the relative attention which was applied to each of the individual chunks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates a flow chart of acts associated with pre-training of a natural language model.

FIG. 8 illustrates a flow chart of acts associated with applying partial attention to chunks to create a long sequence with aggregated attention.

FIG. 9 illustrates a flow chart of acts associated with training a natural language model with sparse labeled data and secondary data.

DETAILED DESCRIPTION

Figure 1:
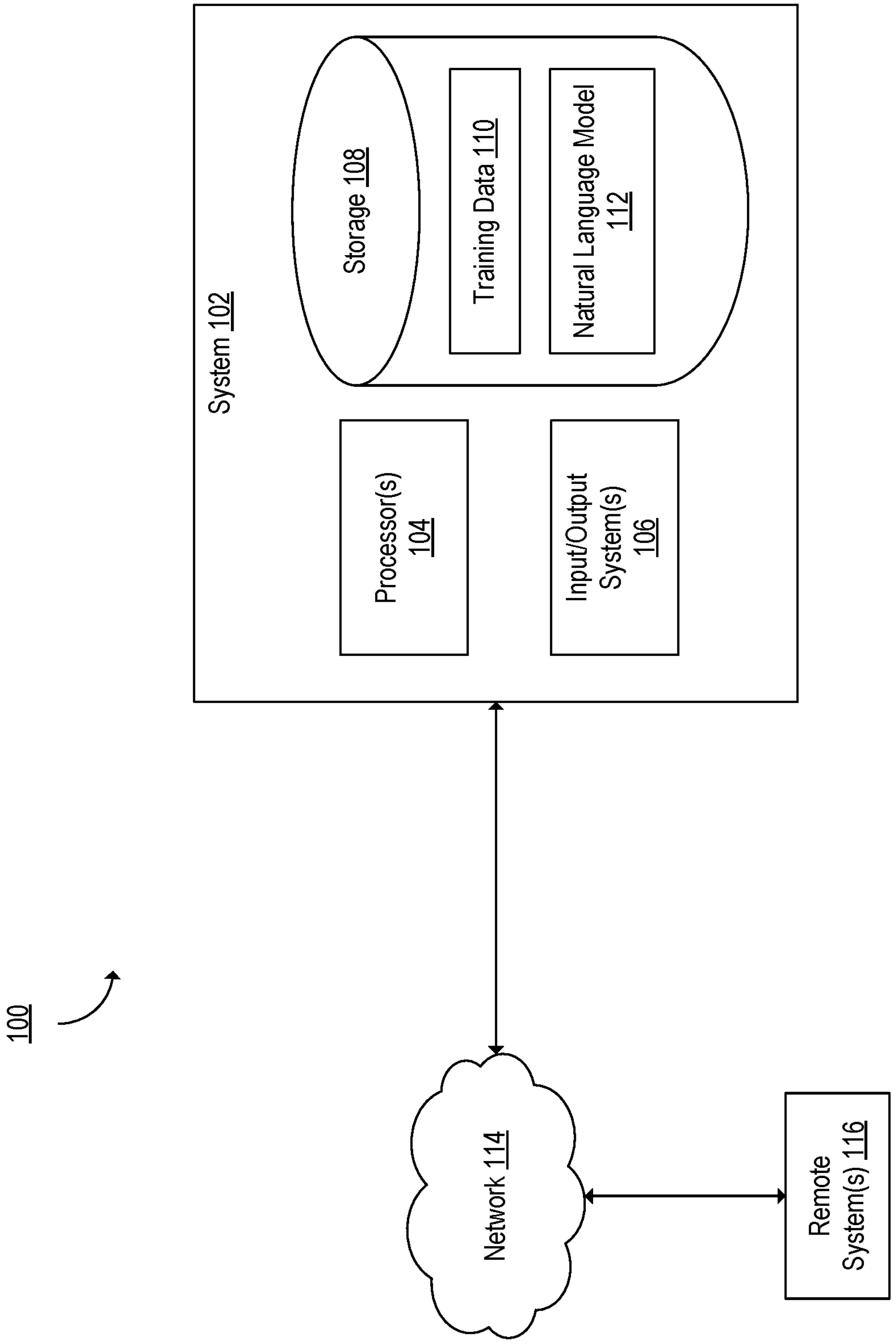
FIG. 1 illustrates an example computing system.

Disclosed embodiments include systems, methods and devices for training a unified language foundation model including but not limited to improving a language foundation model by integrating a generative language model with a replaced token detection (RTD)-like discriminative objective, corrupted span reconstruction (CSR) and, optionally, disentangled attention, which results in a unified encoder-decoder model with improved performance in both natural language understanding (NLU) tasks and natural language generation (NLG) tasks, particularly when compared to conventional models that are used to perform both NLU and NLG tasks and particularly for steaming or other long form datasets.

As described herein, some of the disclosed embodiments pre-train a natural language model. Some embodiments utilize a two-step pre-training method which includes masking tokens following a corrupted span reconstruction methodology and then replacing tokens with a replaced token detection methodology. Some embodiments additionally add attention, such as disentangled attention, in discrete encoded data chunks. The chunks are subsequently concatenated to apply all of the attention that was initially segmented and applied discretely to the different encoded data chunks. Some embodiments also identify rules or instructions from sparse labeled data and identify secondary data corresponding to the rules or instructions to use as additional training data for the natural language model.

Some disclosed embodiments use the trained natural language model to perform natural language generation tasks and natural language understanding tasks. Embodiments further use the trained natural language model to perform summarization tasks. Some embodiments perform multi-lingual natural language generation tasks, natural language understanding tasks, and summarization tasks.

The disclosed embodiments provide technical benefits in the industry by providing improved training of natural language models for performing natural language generation tasks, natural language understanding tasks, and summarization tasks, rather than improving the model for only a single task type. By way of example, enclosed embodiments are enabled to use pre-trained natural language models to perform a variety of natural language generation tasks, such as summarization, as well as natural language understanding tasks, such as sentence classification. Such embodiments are enabled, for example, through the use of corrupted span data that masks subsets of tokens and by generating replacement tokens for ambiguous tokens that replace the masked tokens.

Additionally, the disclosed embodiments improve the efficiency for processing data with a NLP model while applying attention, even for streaming and other long form datasets. The use of applied attention with the NLP model is enabled by splitting up the applied attention to discrete chunks of encoded data by the model and then by combining the encoded data chunks into a single string of encoded data. This application of attention helps in facilitating efficient summarization tasks such as abstractive document summarization and conversational summarization.

Disclosed embodiments can also combine one or more features of the foregoing embodiments to further promote improvements in pre-training natural langue models and the performing of improved natural language processing tasks.

FIG. 1 illustrates one implementation of a computer system that incorporates and/or that can be used to perform the disclosed embodiments. As shown, the computing system 100 includes one or more processors 104 and one or more hardware storage devices 108 storing computer executable instructions, such as training data 110 and a natural language model 112, that, when executed by the one or more processors 104, cause the computing system to perform the functionality described herein. The computing system additionally includes one or more input/output systems 106 and one or more remote systems 116 which may be connected to the system 102 by a network 114.

One example of a natural language model is the T5-like encoder-decoder model which may be used as the natural language model to undergo the training process described in more detail below. The T5-like encoder-decoder base model includes multiple layers of an encoder and decoder (e.g., 15 layers for the encoder and 15 layers for the decoder). The T5 base model also includes hidden dimensions (e.g., 768 hidden dimensions) and self-attention heads (e.g., 12 self-attention heads). The vocabulary of the T5 base model can be manipulated, for example, to include 32 k BPE vocabulary and 128 k sub-word tokens. Other NLP models, besides a T5 base model, can also be used and modified to perform the functionality described herein.

Figure 2:
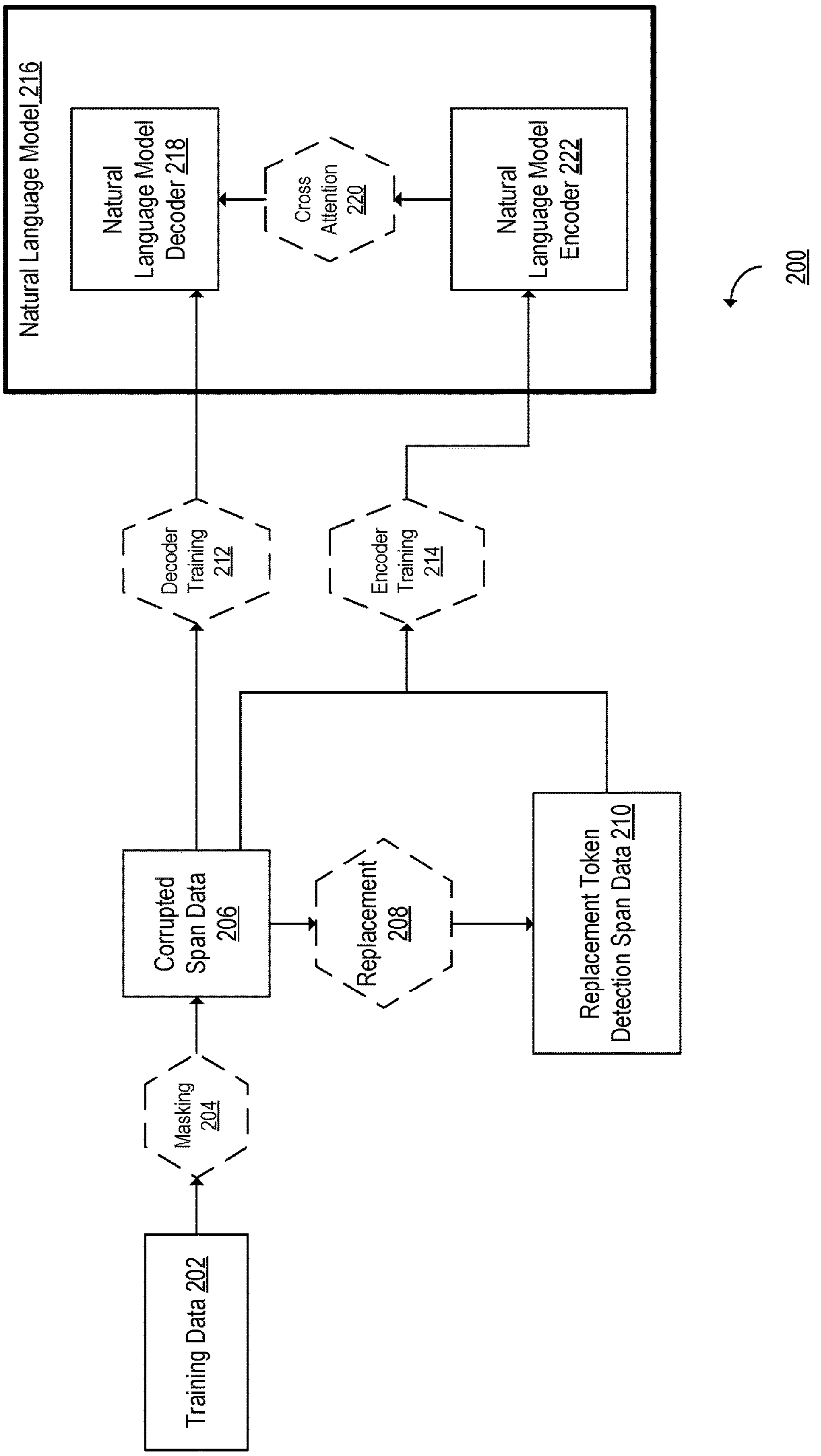
FIG. 2 illustrates a multi-step pre-training of a natural language model.

FIG. 2 illustrates an example diagram of a pre-training process according to some embodiments of a natural language model. Training data 202 may include data sets of various discrete training data sample sizes (e.g., less than 500, about 500, 1,000, 1,500, 2,000, 2,500, 3,000, or more than 3,000 samples), which are applied to various training iterations or steps (e.g., less than 100,000 steps, about 100,000, 125,000, 150,000, or 200,000 steps, or even more than 200,000 steps).

The training data 202 may be extracted from any data source/repository or combination of data sources (e.g., Wikipedia, bookcorpus, or other public and/or private third-party sources).

As described in more detail below, the training data 202 is tokenized and undergoes a masking 204 process to create corrupted span data 206.

The masking process follows a Corrupted Span Prediction (CSP) methodology by masking consecutive tokens with a single sentinel token. The masking of tokens in the tokenized training data generates a resulting data set comprising a corrupted span data set. This corrupted span data is then used for decoder training 212 to train the natural language model decoder 218 in the natural language model 216.

The decoder 218 of a natural language model 216 is trained to reconstruct the span given the corrupted context encoding from an encoder 222 of the natural language model 216 and the corresponding sentinel token from the decoder input.

Masked tokens in the corrupted span data also undergo a replacement process 208 to generate replacement token detection span data 210. The replacement process 208 follows a Replaced Token Detection (RTD) methodology by replacing masked tokens with ambiguous tokens that are generated by a generator or that are obtained from a third-party repository.

The discriminator process causes the model to be trained with the replaced tokens to perform different NLP tasks. In this manner, the model can be trained with significant amounts of training data that is incrementally modified by the replacement tokens. To further enhance the training, in some embodiments, the RTD process occurs until the total number of replaced tokens in the corrupted span data 206 reaches a specific percentage (e.g., less than 10%, about 10%, 15%, 20%, 30%, or more than 30%).

As will be appreciated from the foregoing, the corrupted span data 206 and the replacement token detection span data 210 both are used in encoder training 214 to train the natural language model encoder 222, such that the model is better equipped to perform different types of NLP tasks, including NLU and NLG tasks.

In some embodiments, the encoder 222 applies cross attention 220 to the decoder 218 during training and runtime use. In some embodiments, the cross attention 220 is a disentangled attention methodology. Disentangled attention represents each input word using two separate vectors: the first vector for content and the second vector for position. The attention weights among words are computed using disentangled matrices based on both content and relative position.

Figure 3:
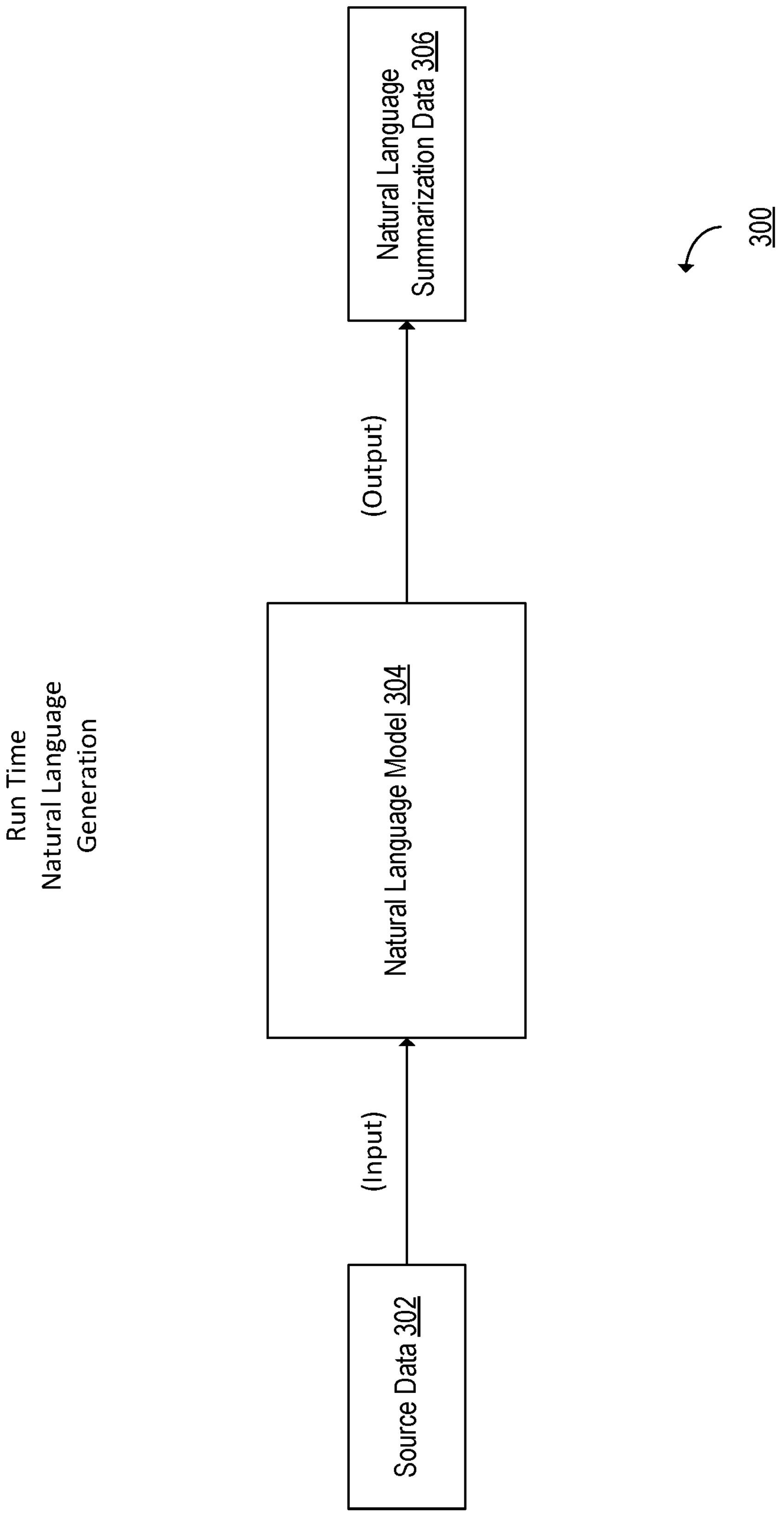
FIG. 3 illustrates the runtime of a natural language generation task using the trained natural language model.

FIG. 3 illustrates an example runtime of using a natural language model for a natural language generation task. The trained natural language model 304 described above can be utilized in a number of natural language generation tasks. First source data 302 is obtained and used as input in the natural language model 304. Natural language summarization data 306 is then outputted from the natural language model 304.

Embodiments of the invention may perform one or more natural language generation tasks. For example, English generation tasks include abstractive document summarization tasks (e.g., Wikilingual-en, XSum, CNNDM), conversational summarization tasks (e.g., SAMSum), or data to text tasks (e.g., WebNLG-en). Other examples are multi-lingual generation tasks including multi-lingual summarization tasks (e.g., MLSum), cross-lingual summarization tasks (e.g., Wikilingual), multi-lingual data to text tasks (e.g., WebNLG), or multi-lingual question answering task (e.g., TyDiQA).

Long document summarization tasks include English summarization of datasets including MediaSum, MultiNews, arXiv, and PubMed. The trained natural language model can also be used for multi-lingual summarization. Multi-lingual summarization tasks can be performed on WikiLingua and MLSum datasets.

When performing the NLG task, the system/model receives a first set of input source data 302, such as an article or paragraph or other literature, and generates a corresponding output of natural language summarization data 306 (e.g., a summary, abstract or other synopsis of the input data).

Figure 4:
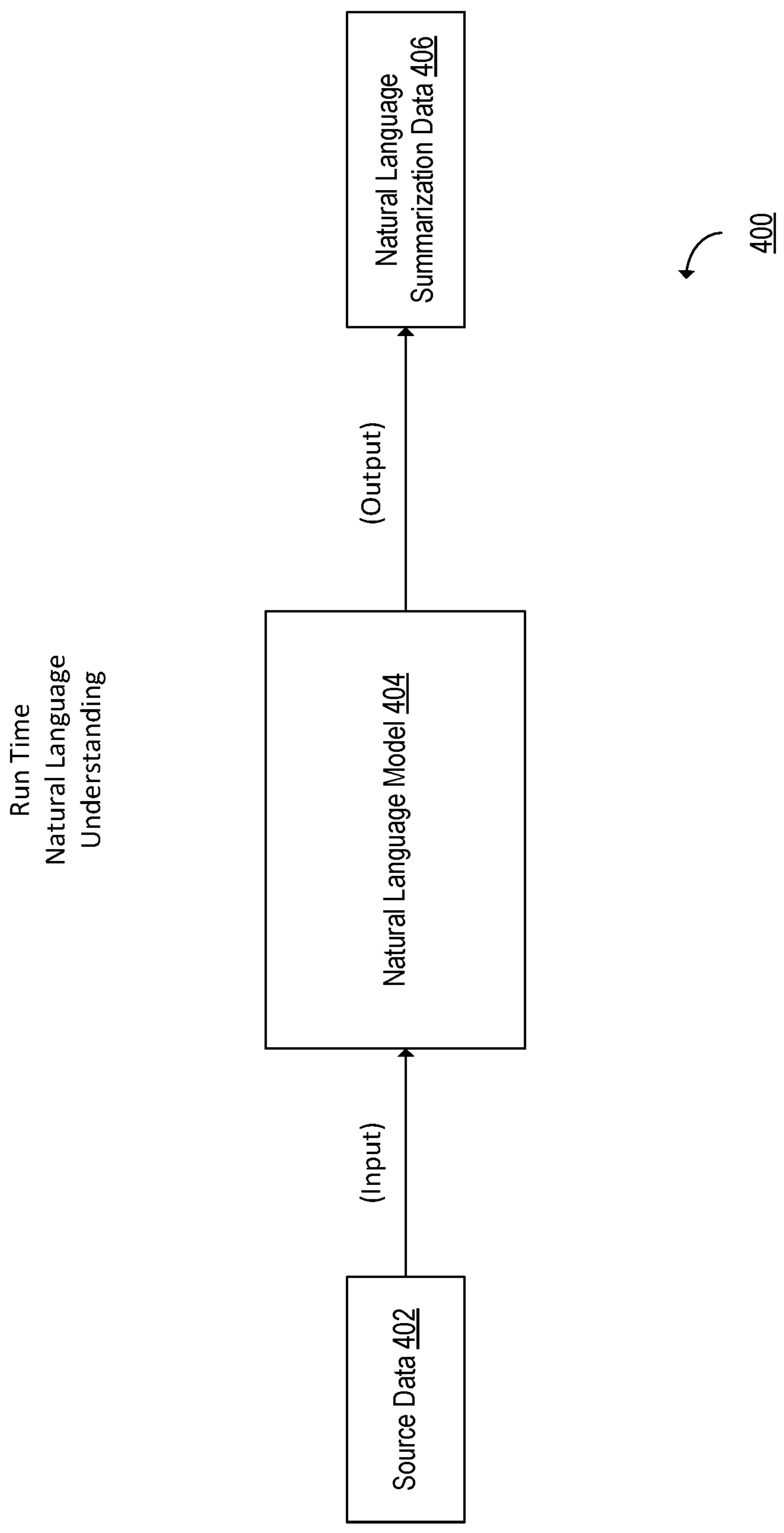
FIG. 4 illustrates the runtime of a natural language understanding task using the trained natural language model.

FIG. 4 illustrates an example runtime of using a natural language model for a natural language understanding task. The trained natural language model 404 described above can be utilized in a number of natural language understanding tasks. First source data 402 is obtained and used as input in the natural language model 404. Natural language summarization data 406 is then outputted from the natural language model 404.

Embodiments of the invention may perform one or more natural language understanding tasks. For example, English understanding tasks include sentence classification tasks (e.g., GLUE). Other examples are multi-lingual understanding tasks including multi-lingual tasks (e.g., XMLI), or multi-lingual question answering task (e.g., TyDiQA).

When performing the NLU task, the system/model receives a first set of input source data 402, such as a question, a sentence, etc., and generates a corresponding output of natural language understanding data 406 (e.g., an answer, a classification, etc. associated with the input data).

Figure 5:
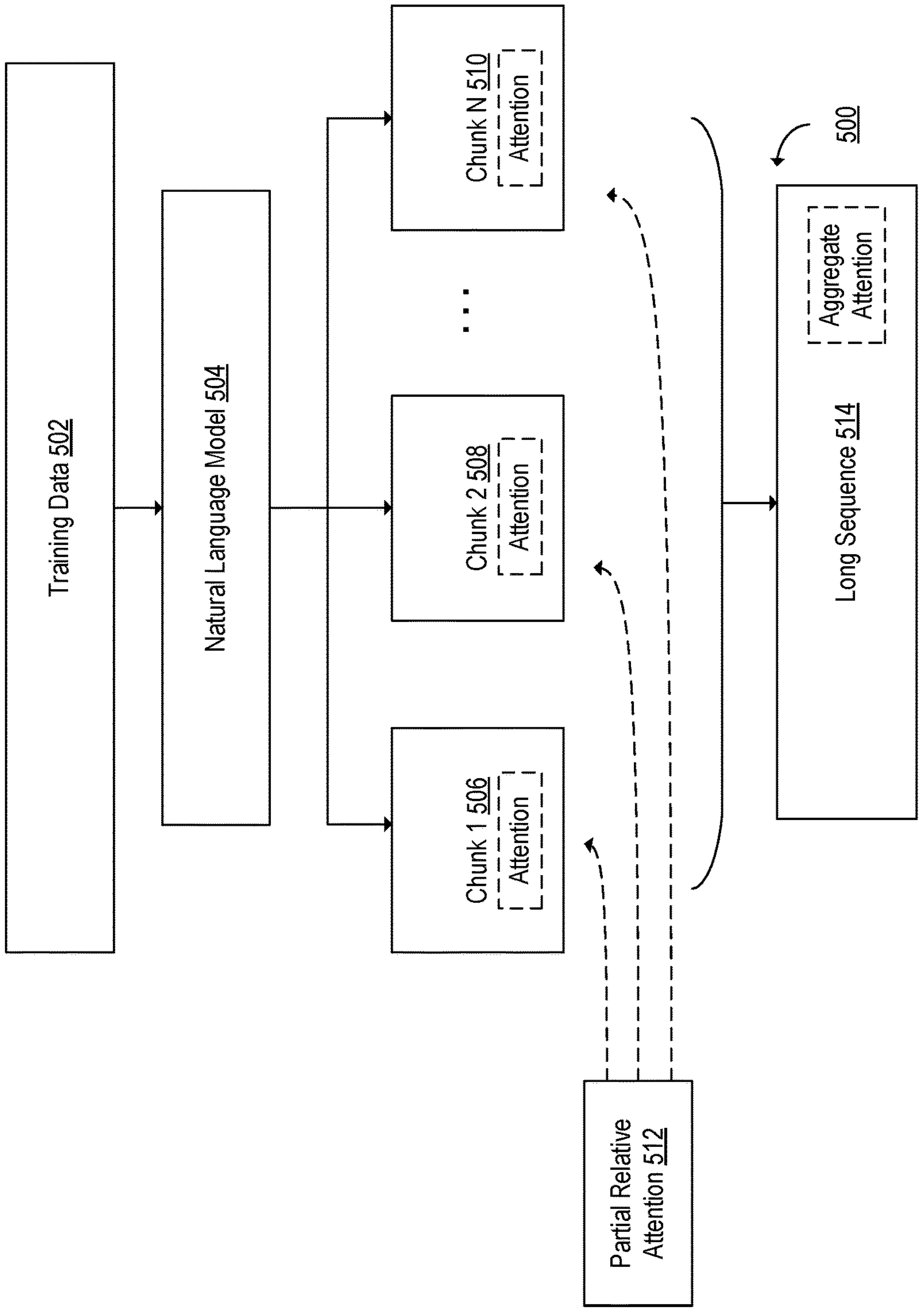
FIG. 5 illustrates applying partial relative attention to chunks and creating a long sequence with aggregate attention.

FIG. 5 illustrates a diagram of an example training method including applying partial relative attention to encoded data in chunks. Training data 502 is first obtained and encoded by the encoder of the natural language model 504. The encoded data is then split into a set of chunks 506-510 where each chunk includes a set of encoded data. The size of the chunks may be constant or vary. Partial relative attention 512 (also referred to as partial, relative, or segmented attention) is applied to the encoded data in each chunk.

The attention applied at each chunk causes different weights to be applied corresponding to the relative importance of proximate and distant token in the encoded chunk. The attention can be applied during or subsequent to the initial encoding of the data. In some embodiments, the attention is a disentangled attention, as previously described in more detail above.

Each chunk with relative attention corresponding to the encoded data of that chunk is then concatenated into a long sequence 514 that incorporates all of the chunks or at least multiple chunks. When concatenated, the long sequence 514 includes aggregate attention from all of the incorporated chunks. By applying the attention discretely, to the different chunks, the model can apply the aggregate attention more efficiently. In particular, the application of the attention is computationally expensive and can become prohibitively difficult to apply for long forms of data, such as streaming data. Even more particularly, by applying attention discretely to different chunks of the data, rather than applying it all at once to the full data set, the system can more efficiently process and apply the attention to streaming and other long forms of data.

Notably, once the natural language model is formed and trained in the manner described, it can be used to perform different summarization and natural language understanding tasks, even for long data forms/sequences.

Figure 6:
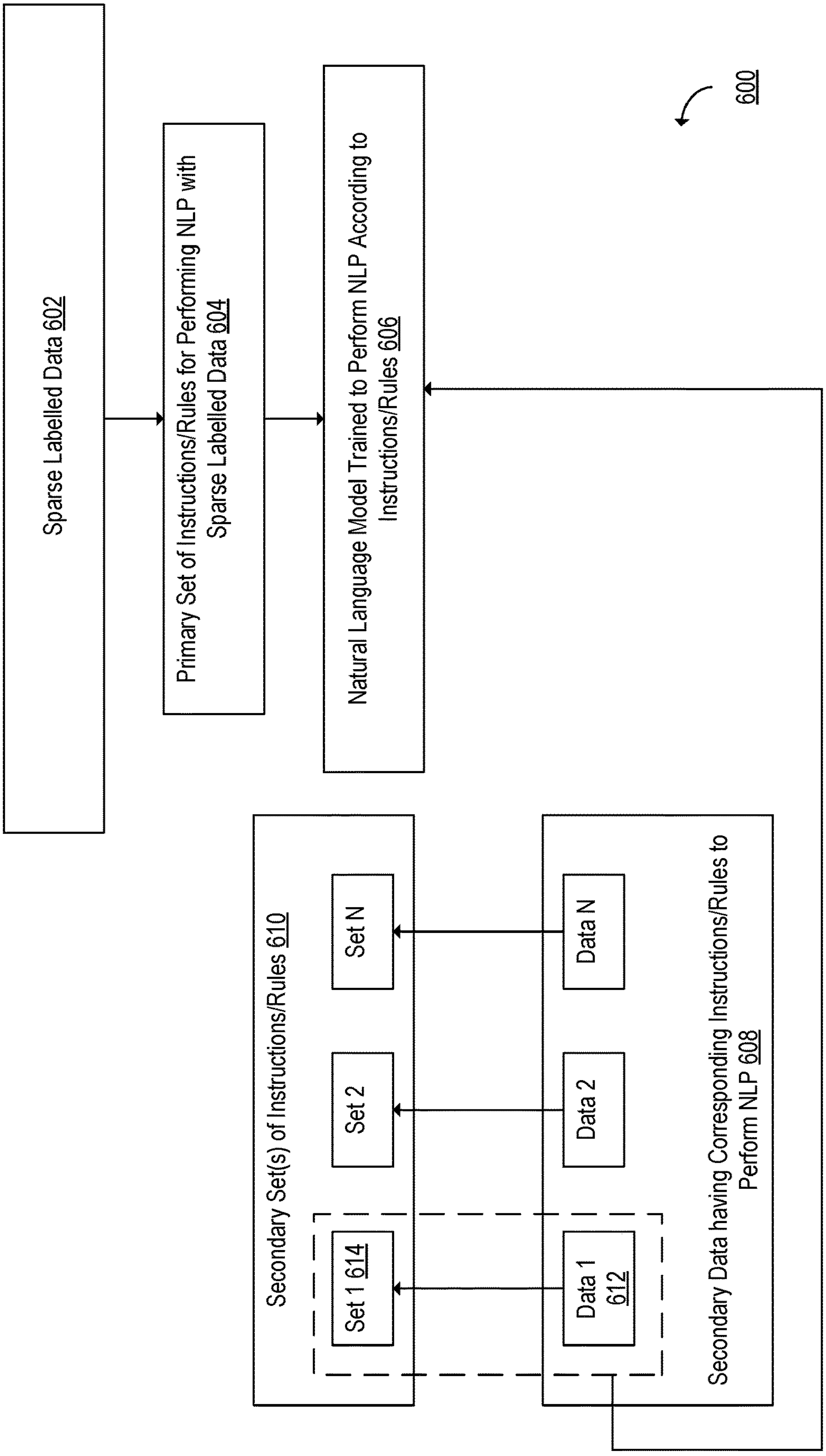
FIG. 6 illustrates training the natural language model with sparse labelled data and secondary data.

FIG. 6 illustrates a diagram 600 of a flowchart associated with other embodiments for obtaining additional training data based on correspondence between rules or instructions of known training data and rules/instructions to similarly types of potential training data that can be used to augment sparse labeled training data when training a natural language model.

In this embodiment, sparse labelled data 602 is first identified from an initial set of training data, along with a primary set of instructions or rules 604 that correspond to the initially identified sparse labelled training data. An example of an instruction is rule for summarizing text (e.g., news article, scientific article, etc.) into a summary (e.g., into one sentence, into one paragraph, etc.). The sparse labelled data 602 and primary set of instructions 604 are then fed into the natural langue model for training 606.

A secondary set of data 608 is then accessed, which can include multiple data sets, including data set 612. Each secondary data set, such as data set 612, has its own corresponding set of instructions or rules (e.g., rule set 614). Each secondary set of instructions or rules 610 is evaluated to determine a level of correspondence/similarity to the primary set of instructions or rules 604. Each secondary data 612 with a corresponding set of rules 614 that satisfies a predetermined level of correspondence/similarity with the primary set of rules is then selected for use as additionally training data for training the natural language model 606 with the sparse labelled data 602. In some embodiments the predetermined level of correspondence is a predetermined value threshold (e.g., at least 50% or 75% similarity). In other instances, the level of correspondence is a relative level, e.g., the data set with the highest correspondence from the secondary set(s).

Attention will now be directed to FIG. 7, which illustrates a flowchart 700 of various acts associated with disclosed methods for performing multi-step pre-training of a natural language model and/or for utilizing a model to perform both NLU and NLG as a result of the training.

As shown, a computing system first accesses a natural language model (act 702) and obtains a set of training data (act 704). The system then tokenizes the training data by creating a set of tokens out of the training data (act 706). Some of the tokens are masked with sentential tokens by the system to generate a corrupted span or corrupted span data (act 708). Some of the masked tokens are then replaced by the system with ambiguous tokens in the corrupted span to generate a replacement token detection span data (act 710). Lastly, the encoder of the natural language model is trained with the (i) replacement token detection span data and (ii) the corrupted span data (act 712).

FIG. 8 illustrates a flowchart 800 of various acts associated with disclosed methods for training and using a natural language model while applying segmented attention to the data being processed by the model to improve efficiencies associated with the application/consideration of the contextual attention.

As shown, the system first accesses a natural language model (act 802) and obtains a set of training data (act 804). The system then encodes the data from the training data (act 806). The encoded data is also separated into a set of chunks (act 808). In some instances, although not shown, the chunks are formed prior to the encoding.

The attention applied to the encoded data at each of the chunks is segmented attention, inasmuch as the attention is discretely processed/applied at each chunk, rather than being applied to all of the encoded data at the same time in a single process. Applying the attention to the different encoded data chunks (810) in this manner is more efficient than applying to the full dataset at once.

After the chunks are encoded and processed for attention, the encoded data chunks are concatenated to create a long representation of the encoded data that includes aggregate attention based on the relative attention applied separately to different encoded data in each chunk (act 812). This long representation of the encoded data can then be used for training the model and/or for performing a NLP task, such as, but not limited to, a summarization of data that the model is applied to.

FIG. 9 illustrates a flowchart 900 of the various acts associated with the disclosed methods in which additional training data is identified based on rules or instructions.

In this embodiment, the computing system accesses a natural language model (act 902) and a set of training data (act 904). A set of sparse labelled data is identified from the set of training data (act 906). A set of instructions or rules are also identified or generated from the sparse labelled data which corresponds to processing of the sparse labelled data by the model (act 908).

The natural language model is then trained with the sparse labelled data (act 910), accordingly.

Additionally, a second set of data which includes corresponding instructions which match the set of instructions corresponding to the set of sparse labelled data, with a predetermined level of correspondence/similarity, is also identified and selected from a larger set of secondary data (act 912). The second set of data is then used to further train the natural language model (act 914) with the sparse labeled training data.

With regard to all of the foregoing embodiments, it will be appreciated that disclosed methods may be implemented by computer systems including one or more processors and computer-readable media such as computer memory that store computer-executable instructions that, when executed by one or more processors, cause various functions (such as the recited acts/methods) to be performed by the computer systems.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media (e.g., one or more computer-readable hardware storage device(s)). In contrast, computer-readable media that merely carry the computer-executable instructions are transmission media (e.g., carrier waves or signals). Accordingly, by way of example, and not limitation, embodiments of the invention can comprise at least two distinctly different kinds of computer-readable media: (i) physical computer-readable storage media/devices and (ii) transmission computer-readable media.

Some examples of physical computer-readable storage media/devices include RAM, ROM, EEPROM, CD-ROM or other optical disk storage (such as CDs, DVDs, etc.), magnetic disk storage or other magnetic storage devices, and/or any other medium, distinguished from a mere carrier wave or transitory signal, and which can be used to store the desired program code in the form of computer-executable instructions or data structures in a format that is accessible by a general purpose or special purpose computer and in a format that is executable by the one or more hardware processors of the computer system to perform the disclosed methods and functionality described herein.

A “network” is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a “NIC”), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for training a natural language model to perform multiple different types of tasks rather than only a single type of task, said method comprising:

accessing a natural language model;

tokenizing a set of training data by creating tokens out of the set of training data;

masking a first subset of the tokens with a single sentinel token, resulting in generation of corrupted span data that is structured to facilitate training the natural language model to perform a natural language understanding task;

separating the set of training data into a set of chunks;

generating encoded data from the set of chunks, wherein each chunk is encoded independently relative to one another, such that chunk-wise encoding is performed;

applying relative attention to different encoded data in each chunk in the set of chunks, wherein applying the relative attention facilitates enabling the natural language model to perform a summarization task, wherein the relative attention is applied after the chunk-wise encoding;

after the relative attention is applied to the set of chunks, concatenating all chunks of the set of chunks into a long representation of the encoded data that includes aggregate attention based on the relative attention applied separately to the different encoded data in each chunk, such that the long representation of the encoded data includes the aggregate attention and such that the long representation is generated after the chunk-wise encoding and after application of the relative attention to the set of chunks; and training the natural language model using the long representation of the encoded data and using the corrupted span data, resulting in the natural language model being trained to perform multiple different types of tasks.

2. The computer-implemented method of claim 1, further comprising:

using the trained natural language model to perform the summarization task.

3. The computer-implemented method of claim 1, wherein each chunk in the set of chunks is a subset of the training data.

4. The computer-implemented method of claim 1, wherein at least one of the relative attention or the aggregate attention is disentangled attention.

5. The computer-implemented method of claim 1, wherein the training data is a paragraph.

6. The computer-implemented method of claim 1, wherein the training data is a sentence.

7. The computer-implemented method of claim 1, wherein the training data is a partial sentence.

8. The computer-implemented method of claim 1, wherein the summarization task comprises abstractive document summarization.

9. The computer-implemented method of claim 1, wherein the summarization task comprises conversational summarization.

10. The computer-implemented method of claim 1, wherein the summarization task comprises multi-lingual question answering.

11. A computing system that trains a natural language model to perform multiple different types of tasks rather than only a single type of task, said computing system comprising:

one or more hardware processors; and one or more hardware storage devices that store instructions that are executable by the one or more hardware processors to cause the computing system to:

access a natural language model;

obtain a set of data;

tokenize the set of data by creating tokens out of the set of data;

mask a first subset of the tokens with a single sentinel token, resulting in generation of corrupted span data that is structured to facilitate training the natural language model to perform a natural language understanding task;

separate the set of data into a set of chunks;

generate encoded data from the set of chunks, wherein each chunk is encoded independently relative to one another, such that chunk-wise encoding is performed;

apply relative attention to different encoded data in each chunk in the set of chunks, wherein applying the relative attention facilitates enabling the natural language model to perform a summarization task, wherein the relative attention is applied after the chunk-wise encoding;

after the relative attention is applied to the set of chunks, concatenate all chunks of the set of chunks into a long representation of the encoded data that includes aggregate attention based on the relative attention applied separately to the different encoded data in each chunk, such that the long representation of the encoded data includes the aggregate attention and such that the long representation is generated after the chunk-wise encoding and after application of the relative attention to the set of chunks; and train the natural language model using the long representation of the encoded data and using the corrupted span data, resulting in the natural language model being trained to perform multiple different types of tasks.

12. The computing system of claim 11, the method further comprising:

using the trained natural language model to perform the summarization task.

13. The computing system of claim 11, wherein each chunk in the set of chunks is a subset of the data.

14. The computing system of claim 11, wherein at least one of the relative attention or the aggregate attention is disentangled attention.

15. The computing system of claim 11, wherein the training data is a paragraph.

16. The computing system of claim 11, wherein the training data is a sentence.

17. The computing system of claim 11, wherein the training data is a partial sentence.

18. One or more hardware storage devices that store instructions that are executable by one or more hardware processors to cause the one or more processors to:

access a natural language model;

obtain a set of data;

tokenize the set of data by creating tokens out of the set of data;

mask a first subset of the tokens with a single sentinel token, resulting in generation of corrupted span data that is structured to facilitate training the natural language model to perform a natural language understanding task;

separate the set of data into a set of chunks;

generate encoded data from the set of chunks, wherein each chunk is encoded independently relative to one another, such that chunk-wise encoding is performed;

apply relative attention to different encoded data in each chunk in the set of chunks, wherein applying the relative attention facilitates enabling the natural language model to perform a summarization task, wherein the relative attention is applied after the chunk-wise encoding;

after the relative attention is applied to the set of chunks, concatenate all chunks of the set of chunks into a long representation of the encoded data that includes aggregate attention based on the relative attention applied separately to the different encoded data in each chunk, such that the long representation of the encoded data includes the aggregate attention and such that the long representation is generated after the chunk-wise encoding and after application of the relative attention to the set of chunks; and train the natural language model using the long representation of the encoded data and using the corrupted span data, resulting in the natural language model being trained to perform multiple different types of tasks.

* * * * *